United States Patent [19]

Chiang

[11] Patent Number: 5,709,007
[45] Date of Patent: Jan. 20, 1998

[54] REMOTE CONTROL VACUUM CLEANER

[76] Inventor: Wayne Chiang, 36-21 Prince St., Flushing, N.Y. 11354

[21] Appl. No.: 660,922

[22] Filed: Jun. 10, 1996

[51] Int. Cl.[6] ..................................................... A47L 9/00
[52] U.S. Cl. ...................... 15/329; 15/339; 15/340.1; 15/DIG. 1
[58] Field of Search .................... 15/339, 340.1, 15/352, 329, 344

[56] References Cited

U.S. PATENT DOCUMENTS

| | | | |
|---|---|---|---|
| 3,010,129 | 11/1961 | Moore | 15/340.1 X |
| 4,306,329 | 12/1981 | Yokoi . | |
| 4,369,543 | 1/1983 | Chen et al. . | |
| 4,747,178 | 5/1988 | Breitbach | 15/339 |
| 4,782,550 | 11/1988 | Jacobs | 15/340.1 X |
| 4,854,000 | 8/1989 | Takimoto | 15/340.1 X |
| 5,095,577 | 3/1992 | Jonas et al. | 15/340.1 X |
| 5,279,012 | 1/1994 | Sloan . | |
| 5,454,129 | 10/1995 | Kell . | |
| 5,515,573 | 5/1996 | Frey | 15/339 X |
| 5,524,321 | 6/1996 | Weaver et al. | 15/339 X |
| 5,560,077 | 10/1996 | Crotchett | 15/340.1 X |

*Primary Examiner*—Chris K. Moore
*Attorney, Agent, or Firm*—Michael I. Kroll

[57] ABSTRACT

A remote control vacuum cleaner (10) comprising a mobile unit (12) and a vacuum unit (14). A facility (16) is for attaching the vacuum unit (14) onto the mobile unit (12) in a removable manner. A remote control unit (18) is provided, to operate the mobile unit (12) and the vacuum unit (14), so that the mobile unit (12) will move along a floor (20), while the vacuum unit (14) will clean by suction, the dirt and dust from the floor (20).

23 Claims, 4 Drawing Sheets

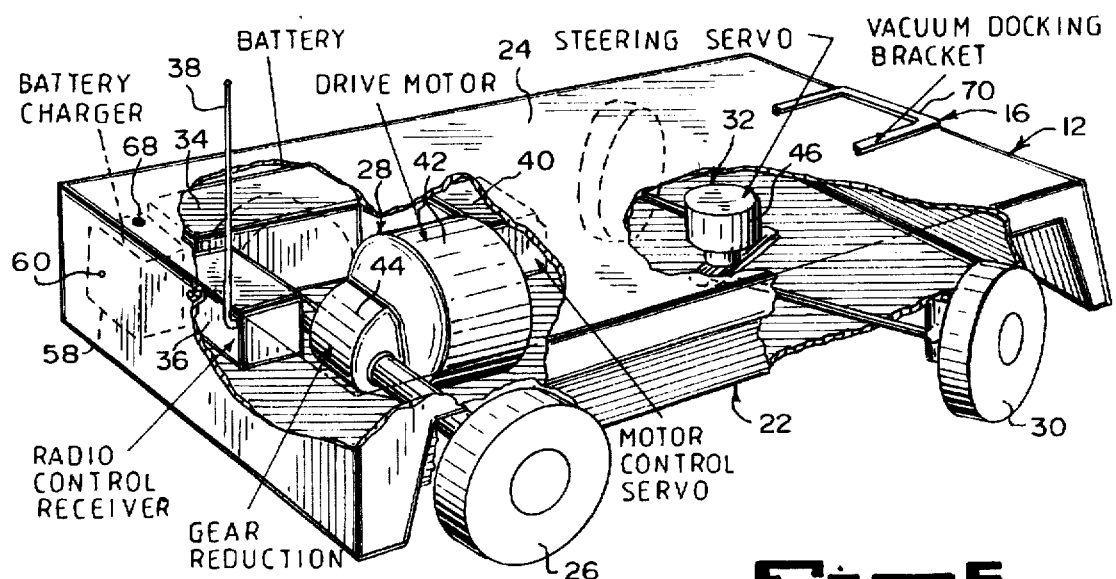
Fig. 5
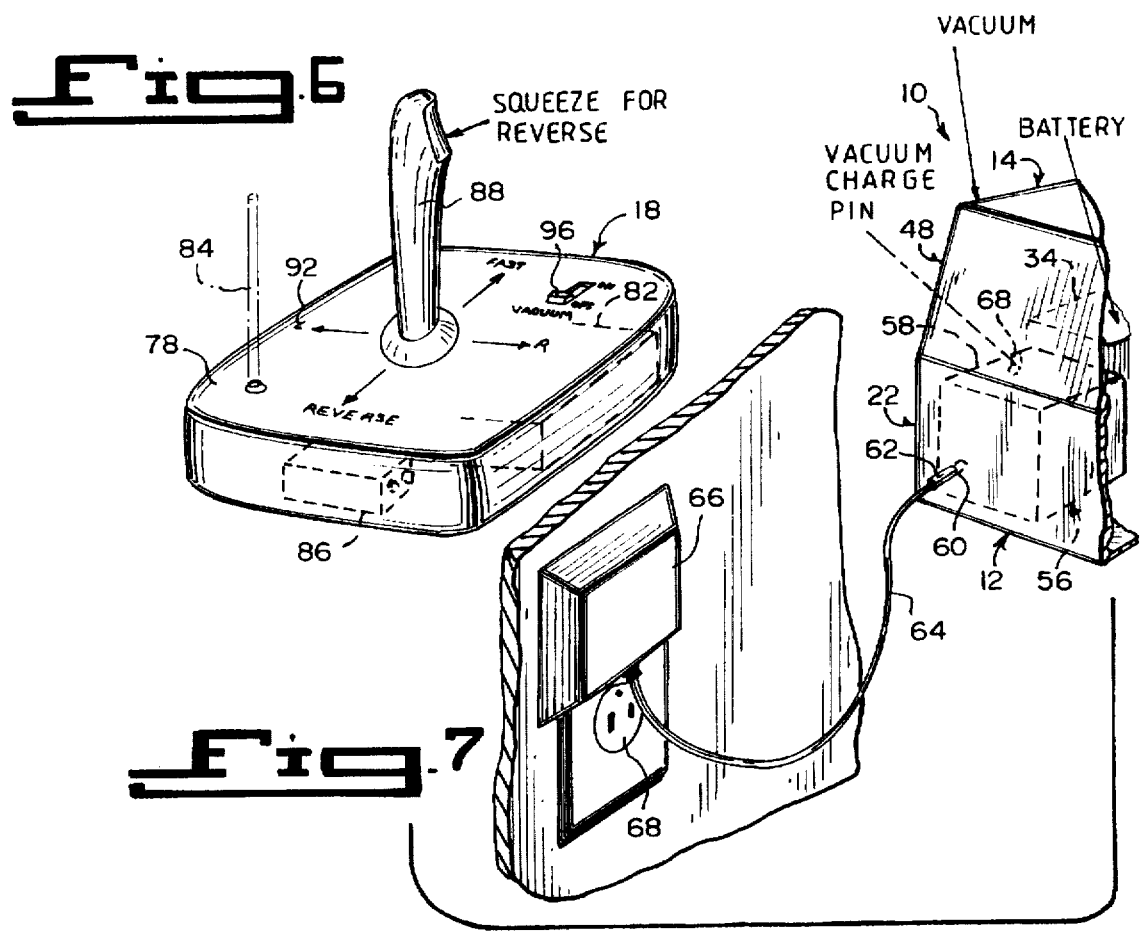
Fig. 6
Fig. 7

REMOTE CONTROL VACUUM CLEANER

BACKGROUND OF THE INVENTION

1. Field of the Invention

The instant invention relates generally to self-propelled cleaning devices and more specifically it relates to a remote control vacuum cleaner.

2. Description of the Prior Art

Numerous self-propelled cleaning devices have been provided in prior art. For example, U.S. Pat. Nos. 4,306,329 to Yokoi; 4,369,543 to Chen et al.; 5,279,012 to Sloan and 5,454,129 to Kell all are illustrative of such prior art. While these units may be suitable for the particular purpose to which they address, they would not be as suitable for the purposes of the present invention as heretofore described.

YOKOI, GUNPEI

SELF-PROPELLED CLEANING DEVICE WITH WIRELESS REMOTE-CONTROL

U.S. Pat. No. 4,306,329

A self-propelled cleaning device with wireless remote control includes a body, a driving device on the body for moving the same rotatably about its axis or in a straight line along the underlying ground surface, and a vacuum cleaning device carried on the body with its suction port open to the underside thereof. The cleaning device normally rotates on its axis at a stationary or fixed location on the underlying surface for concentrated spot cleaning of the underlying surface. The wireless remote control is effective to change the operative mode of the cleaning device from stationary rotation to straight-line travel.

CHEN, JEN CHEN, HONG

REMOTE-CONTROL RADIO VACUUM CLEANER

U.S. Pat. No. 4,369,543

A remote-control radio vacuum cleaner comprises a remote control device having radio transmitting circuits matched with a control mechanism for generating various control signals. A separate vacuum cleaner structure is disposed with vacuum cleaning fittings for dust suction operations. A storage battery system is for supplying the required power in the vacuum cleaning structure. A radio receiving circuit is disposed with respect to the transmitting circuits. D.C. motors are arranged in conjunction with the radio receiving circuit for moving the vacuum cleaner in performing dust cleaning work under the control of the remote control device.

SLOAN, ALBERT H.

SELF-PROPELLED STEERABLE APPARATUS FOR REMOVING MATERIAL FROM SURFACE OF CONFINED AREA

U.S. Pat. No. 5,279,012

Self-propelled steerable apparatus for removing material, such as sludge, from the bottom surface of a liquid storage tank for disposition elsewhere comprises a support platform and a reversely rotatable motor-driven auger mounted below the support platform and cooperating therewith to define a space for receiving sludge when the rotatable auger is engaged with the surface. A motor-driven pump mounted on the support platform is operable to receive sludge from the auger and deliver it through a discharge hose to a remote location. Rotation of the auger delivers the sludge to the pump and propels the apparatus across the surface. A remotely controllable steering mechanism on the support platform has a tail wheel which engages the surface and steers the apparatus along a desired path. A winch-controlled back-haul cable is connected to the apparatus to periodically stop forward movement of the apparatus while the auger is still rotating, so that the sludge can be more efficiently removed.

KELL, RICHARD T.

SELF-POWERED POOL VACUUM WITH REMOTE CONTROLLED CAPABILITIES

U.S. Pat. No. 5,454,129

A self-powered pool vacuum with remote controlled capabilities. The vacuum includes a head having a lower base in a generally rectangular configuration with side openings extending vertically therethrough and an enlarged leading edge. The head also includes an intermediate cover positionable over the base with a central aperture extending therethrough with an apertured peripheral flange and a gasket positionable between the flange and the base. Also included is a top cover positionable over the intermediate cover and base for constituting a plenum zone. The top cover includes an aperture for coupling to a suction hose and an antennae extending upwardly therefrom. A brush is peripherally positionable downwardly from the lower face of the base. Parallel axles extending transversely through the base with drive wheels on one of the axles. Steering wheels are pivotally coupled to others of the axles with a steering rod for pivoting the wheels to change directions. A drive motor is within the housing, to rotate the drive wheels. A steering motor is provided, for axially shifting the steering rods. A receiver is within the base to drive the steering motor in one direction or another in response to signals from the antennae and receiver.

SUMMARY OF THE INVENTION

A primary object of the present invention is to provide a remote control vacuum cleaner that will overcome the shortcomings of the prior art devices.

Another object is to provide a remote control vacuum cleaner being a three part system, consisting of a mobile unit and an interconnecting vacuum unit that are both operated by a remote control unit.

An additional object is to provide a remote control vacuum cleaner, in which the vacuum unit can be quickly separated from the mobile unit, so that the vacuum unit can be used as an independent cordless handy appliance.

A further object is to provide a remote control vacuum cleaner that is simple and easy to use.

A still further object is to provide a remote control vacuum cleaner that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 5 is an enlarged perspective view of the mobile unit of the second embodiment with the body broken away and in section, to show the internal components thereof.

FIG. 6 is an enlarged perspective view of the remote control unit shown in FIG. 1.

FIG. 7 is a perspective view with parts broken away and in section of the second embodiment, showing the battery charger in the mobile unit plugged into a wall outlet to simultaneously recharge the batteries in the mobile unit and the vacuum unit.

Similar reference characters denote corresponding features consistently throughout the attached drawings.

DETAILED DESCRIPTION OF THE PREFERRED EMBODIMENTS

Figure 1:
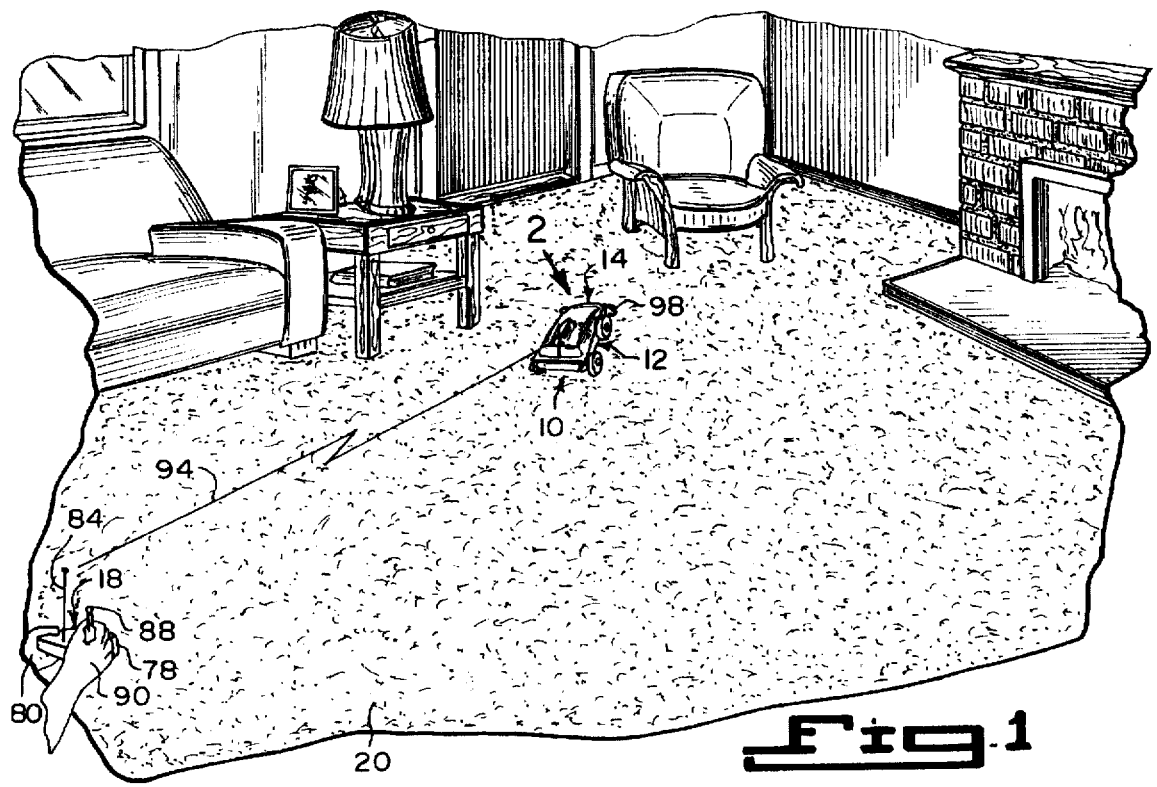
FIG. 1 is a rear perspective view of a first embodiment of the instant invention in use.
Figure 2:
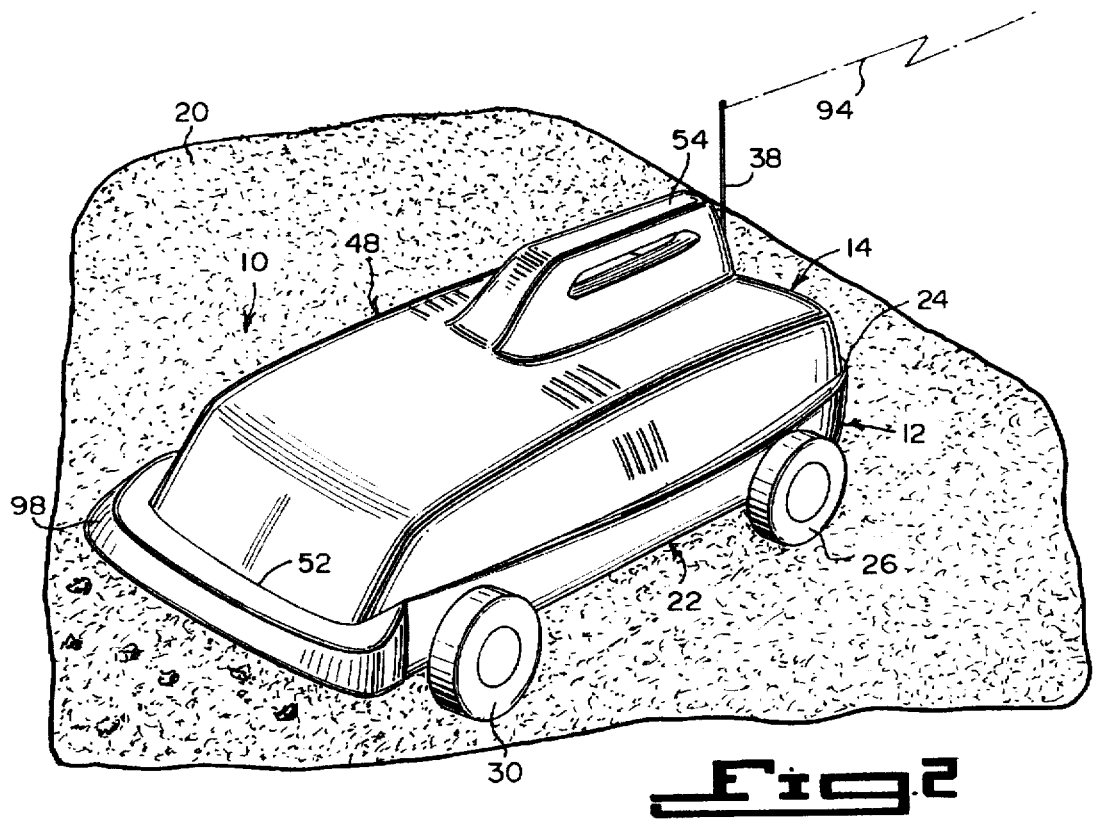
FIG. 2 is an enlarged front perspective view taken in the direction of arrow 2 in FIG. 1, of the vacuum unit on the mobile unit.
Figure 3:
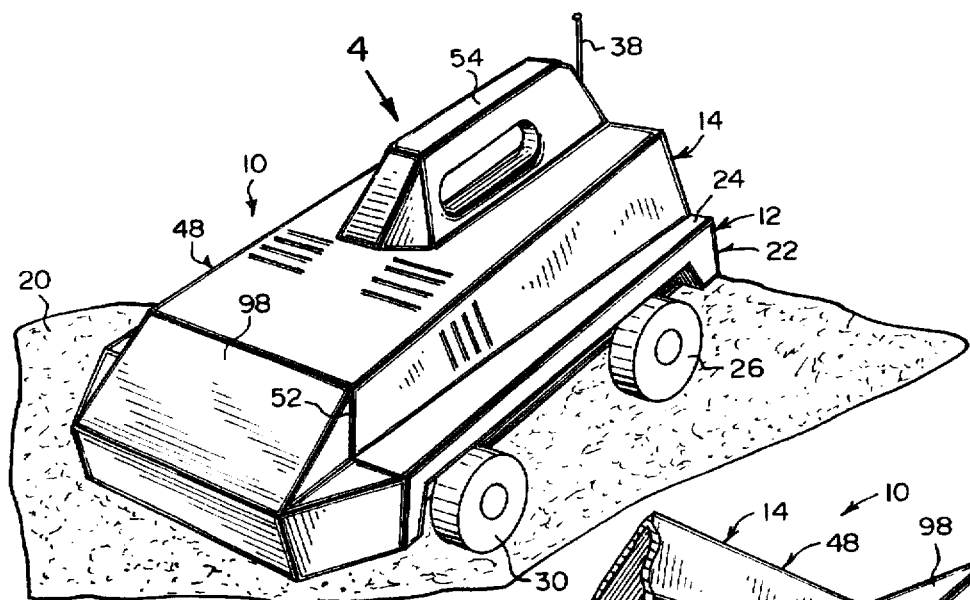
FIG. 3 is an enlarged front perspective view similar to FIG. 2, showing a second embodiment in which the housing of the vacuum unit and the body of the mobile unit are of a more rugged appearance.

Turning now descriptively to the drawings, in which similar reference characters denote similar elements throughout the several views, FIGS. 1 through 9 illustrate a remote control vacuum cleaner 10 comprising a mobile unit 12 and a vacuum unit 14. A facility 16 is for attaching the vacuum unit 14 onto the mobile unit 12 in a removable manner. A remote control unit 18 is provided to operate the mobile unit 12 and the vacuum unit 14, so that the mobile unit 12 will move along a floor 20, while the vacuum unit 14 will clean by suction, dirt and dust from the floor 20.

The mobile unit 12 includes a generally rectangular shaped body 22 having a flat top wall 24. A rear wheel assembly 26 is in the body 22. A system 28 is for driving the rear wheel assembly 22. A front wheel assembly 30 is in the body 22. A component 32 is for steering the front wheel assembly 30.

The driving system 28 consists of a battery 34 carried in the body 22 to supply power for the driving system 28. A radio control receiver 36 with a receiver antenna 38 is carried in the body 22 and is electrically connected to the battery 34. A motor control servo 40 is carried in the body 22 and is electrically connected to the radio control receiver 36. A drive motor 42 is carried in the body 22 and is operated by the motor control servo 40. A gear reduction 44 is coupled to the rear wheel assembly 26 and is operated by the drive motor 42. The steering component 32 is a steering servo 46 carried in the body 22 electrically connected to the radio control receiver 36 and is operable to the front wheel assembly 30.

The vacuum unit 14 comprises a generally rectangular shaped housing 48 having a flat bottom wall 50 to carry the various components for operating the vacuum unit 14. A suction nozzle 52 is on a front end of the housing 48. A handle 54 is on the housing 48. When the vacuum unit 14 is removed from the mobile unit 12, a person can grasp the handle 54 and use the vacuum unit 14 as an independent cordless handy appliance.

A device 56, shown in FIG. 7, is for recharging the battery 34 built into the body 22. The recharging device 56 includes a battery charger 58 carried in the body 22 and electrically connected to the battery 34. A jack 60 in the body 22 is electrically connected to the battery charger 58. A jack plug 62 is to engage with the jack 60. An elongated electrical cord 64 is connected at a first end to the jack plug 62. A transformer plug 66 is connected to a second end of the elongated electrical cord 64. The transformer plug 66 engages with a wall outlet 68 to operate the battery charger 58 in the body 22. A vacuum charge pin 68 is electrically connected to the battery charger 58. When the vacuum unit 14 is attached to the mobile unit 12, the battery charger 58 will also recharge a battery carried within the housing 48 of the vacuum unit 14.

Figure 4A:
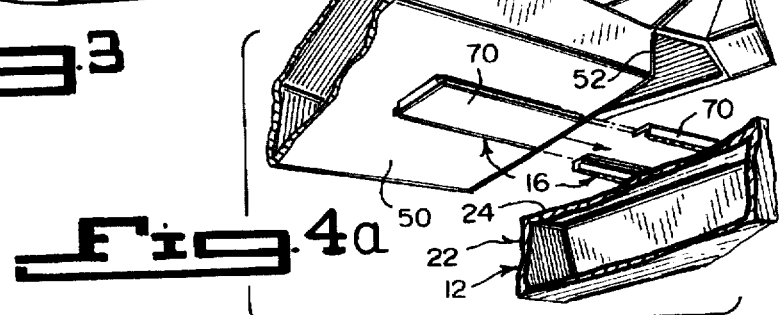
FIG. 4a is a perspective view taken in the direction of arrow 4a in FIG. 4, with parts broken away and in section.
Figure 4:
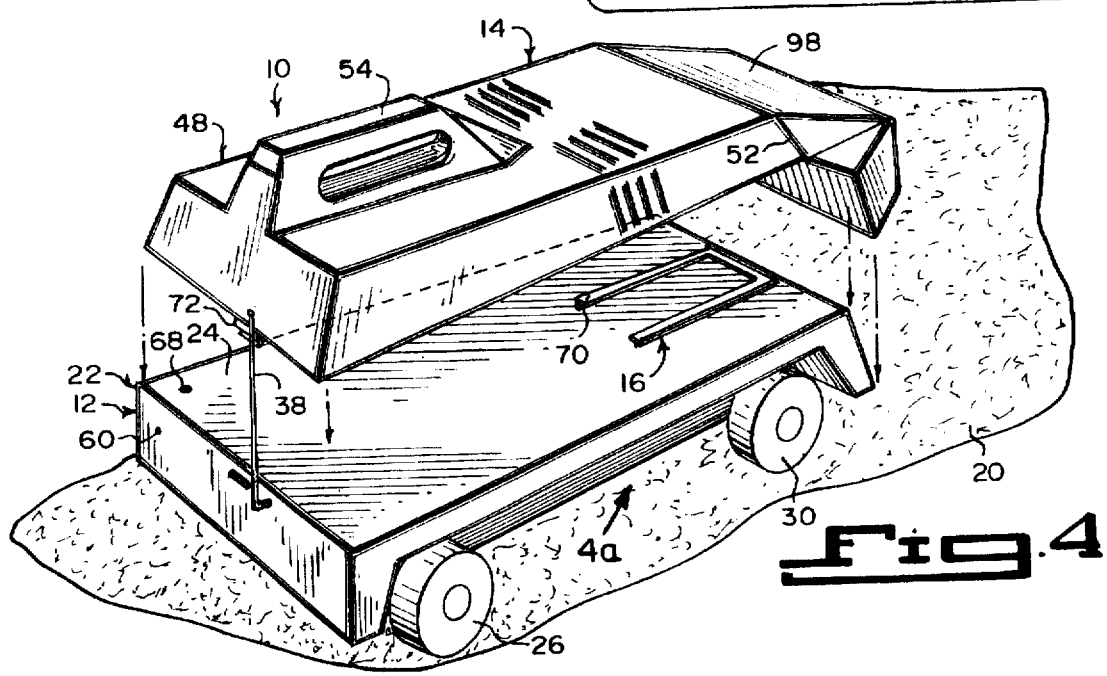
FIG. 4 is an enlarged rear perspective view taken in the direction of arrow 4 in FIG. 3, with the vacuum unit separated from the mobile unit.

The attaching facility 16 in FIGS. 4, 4a and 5, includes a vacuum docking bracket 70 located at a forward end between the mobile unit 12 and the vacuum unit 14. A spring clip latching mechanism 72 is at a rearward end between the mobile unit 12 and the vacuum unit 14.

Figure 9:
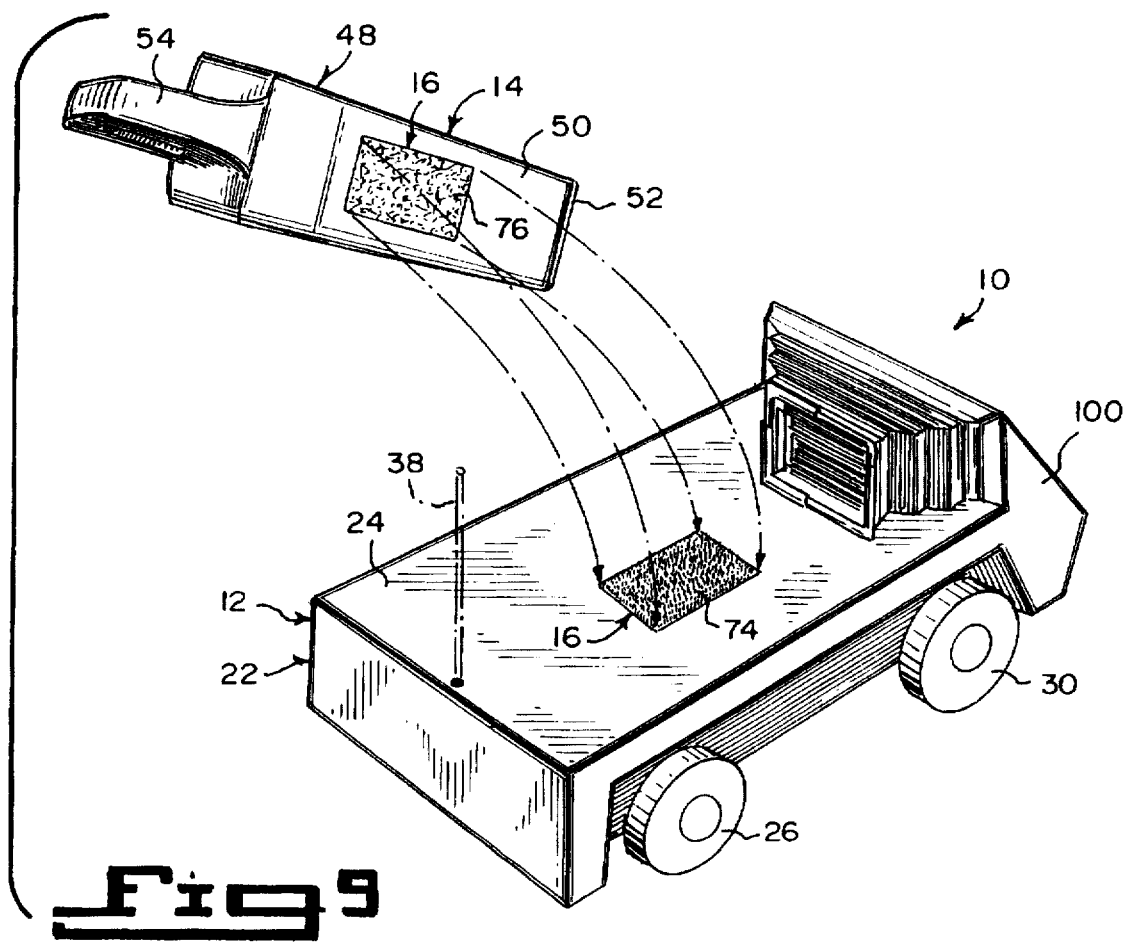
FIG. 9 is a rear perspective view taken in the direction of arrow 9 in FIG. 8, with the vacuum unit removed from the mobile unit and ready to be replaced and secured by VELCRO pads.

The attaching facility 16 in FIG. 9, consists of a first VELCRO pad 74 affixed onto the mobile unit 12. A second VELCRO pad 76 is affixed under the vacuum unit 14. When the vacuum unit 14 is placed upon the mobile unit 12, the first VELCRO pad 14 will mate with the second VELCRO pad 76.

The remote control unit 18, shown in FIGS. 1 and 6, comprises a casing 78, which can be held by a first hand 80 of a person. A radio control transmitter 82 with a transmitter antenna 84 is carried in the casing 78. A battery 86 is carried in the casing 78, to supply power to the radio control transmitter 82. An upstanding operating lever 88 extending in a vertical position from the casing 78 is electrically connected to the radio control transmitter 82, and is movable to an angular position by a second hand 90 of the person. Indicia 92 is on a top surface of the casing 78 about the operating lever 88, to indicate movement of the operating lever 88 forward, rearward, left and right for activating the radio control transmitter 82 to send electrical signals 94 to the mobile unit 12. An on/off switch is in the casing 78 for the vacuum unit 14.

Figure 8:
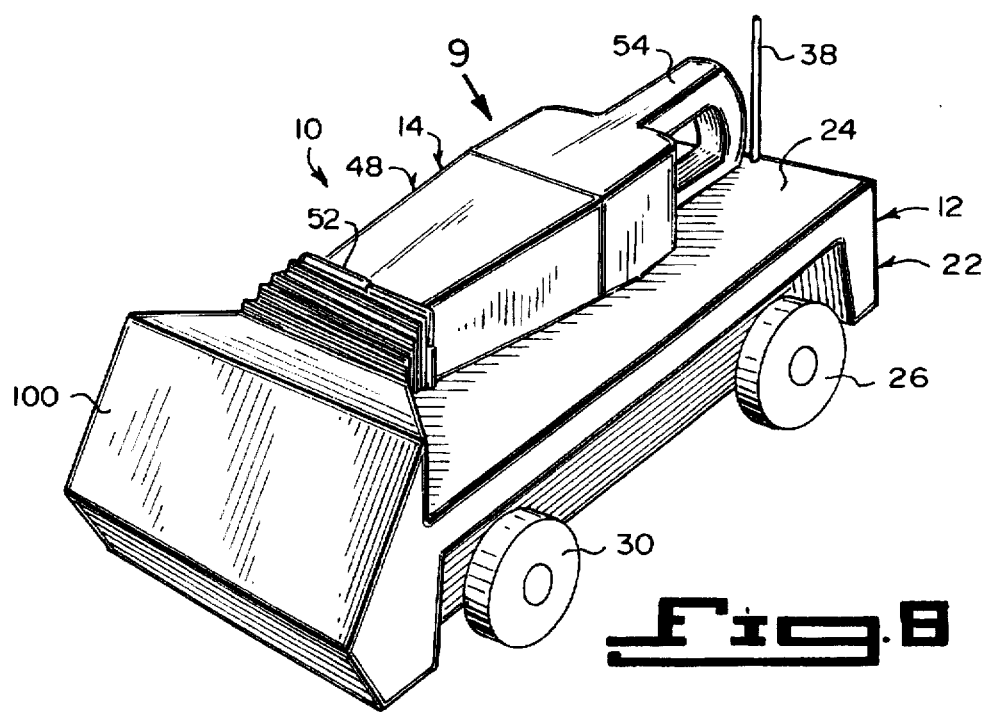
FIG. 8 is an enlarged front perspective view of a third embodiment of the instant invention.

FIGS. 1 through 4 shows a suction nozzle hood adapter 98 hinged to the suction nozzle 52 of the housing 48 of the vacuum unit 14. The suction nozzle hood adapter 98 will reach down to suck up the dirt and dust upon the floor 20. In FIGS. 8 and 9, a suction nozzle hood adapter 100 is built into a forward end of the mobile unit 12. The suction nozzle 52 of the housing 48 of the vacuum unit 14, can plug into the suction nozzle hood adapter 100, to suck up the dirt and dust from the floor 20.

List of Reference Numbers 10 remote control vacuum cleaner
12 mobile unit of 10
14 vacuum unit of 10
16 attaching facility of 10
18 remote control unit of 10
20 floor
22 generally rectangular shaped body of 12
24 flat top wall of 22
26 rear wheel assembly of 12
28 driving system of 12
30 front wheel assembly of 12
32 steering component of 12
34 battery of 28
36 radio control receiver of 28
38 receiver antenna of 36
40 motor control servo of 28
42 drive motor of 28
44 gear reduction of 28
46 steering servo for 32
48 generally rectangular shaped housing of 14
50 flat bottom wall of 48
52 suction nozzle on 48
54 handle on 48
56 recharging device in 22
58 battery charger of 56
60 jack of 56
62 jack plug of 56
64 elongated electrical cord of 56
66 transformer plug of 56
68 vacuum charge pin of 56
70 vacuum docking bracket of 16
72 spring clip latching mechanism of 16
74 first VELCRO pad of 16
76 second VELCRO pad of 16
78 casing of 18
80 first hand of person
82 radio control transmitter in 78
84 transmitter antenna of 82
86 battery in 78
88 operating lever in 78
90 second hand of the person
92 indicia on 78
94 electrical signal
96 on/off switch in 78
98 suction nozzle hood adapter on 52
100 suction nozzle hood adapter on 12

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A remote control vacuum cleaner comprising:
    a) a mobile unit;
    b) a vacuum unit;
    c) means for attaching said vacuum unit onto said mobile unit in a removable manner; and
    d) a remote control unit to operate said mobile unit and said vacuum unit, so that said mobile unit will move along a floor, while said vacuum unit will clean by suction, dirt and dust from the floor.

2. A remote control vacuum cleaner as recited in claim 1, wherein said mobile unit includes:
    a) a generally rectangular shaped body having a flat top wall;
    b) a rear wheel assembly in said body;
    c) means for driving said rear wheel assembly;
    d) a front wheel assembly in said body; and
    e) means for steering said front wheel assembly.

3. A remote control vacuum cleaner as recited in claim 2, wherein said driving means includes:
    a) a battery carried in said body to supply power for said driving means;
    b) a radio control receiver with a receiver antenna carried in said body and electrically connected to said battery;
    c) a motor control servo carried in said body and electrically connected to said radio control receiver;
    d) a drive motor carried in said body and operated by said motor control servo; and
    e) a gear reduction coupled to said rear wheel assembly and operated by said drive motor.

4. A remote control vacuum cleaner as recited in claim 3, wherein said steering means includes a steering servo carried in said body electrically connected to said radio control receiver and operable to said front wheel assembly.

5. A remote control vacuum cleaner as recited in claim 1, wherein said vacuum unit includes:
    a) a generally rectangular shaped housing having a flat bottom wall to carry the various components for operating said vacuum unit;
    b) a suction nozzle on a front end of said housing; and
    c) a handle on said housing, so that when said vacuum unit is removed from said mobile unit, a person can grasp said handle and use said vacuum unit as an independent cordless handy appliance.

6. A remote control vacuum cleaner as recited in claim 5, further including means for recharging said battery built into said body, wherein said recharging means includes:
    a) a battery charger carried in said body and electrically connected to said battery;
    b) a jack in said body electrically connected to said battery charger;
    c) a jack plug to engage with said jack;
    d) an elongated electrical cord connected at a first end to said jack plug; and
    e) a transformer plug connected to a second end of said elongated electrical cord, whereby said transformer plug engages with a wall outlet to operate said battery charger in said body.

7. A remote control vacuum cleaner as recited in claim 6, wherein said recharging means further includes a vacuum charge pin electrically connected to said battery charger, so that when said vacuum unit is attached to said mobile unit, said battery charger will also recharge a battery carried within said housing of said vacuum unit.

8. A remote control vacuum cleaner as recited in claim 5, further including a suction nozzle hood adapter hinged to said suction nozzle of said housing of said vacuum unit, so that said suction nozzle hood adapter will reach down to suck up the dirt and dust upon the floor.

9. A remote control vacuum cleaner as recited in claim 5, further including a suction nozzle hood adapter built into a forward end of said mobile unit, so that said suction nozzle of said housing of said vacuum unit can plug into said suction nozzle hood adapter to suck up the dirt and dust upon the floor.

10. A remote control vacuum cleaner as recited in claim 1, wherein said attaching means includes:

a) a vacuum docking bracket located at a forward end between said mobile unit and said vacuum unit; and b) a spring clip latching mechanism at a rearward end between said mobile unit and said vacuum unit.

11. A remote control vacuum cleaner as recited in claim 1, wherein said attaching means includes:

a) a first VELCRO pad affixed onto said mobile unit; and b) a second VELCRO pad affixed under said vacuum unit, so that when said vacuum unit is placed upon said mobile unit, said first VELCRO pad will mate with said second VELCRO pad.

12. A remote control vacuum cleaner as recited in claim 1, wherein said remote control unit includes:

a) a casing held by a first hand of a person;

b) a radio control transmitter with a transmitter antenna carried in said casing;

c) a battery carried in said casing, to supply power to said radio control transmitter;

d) an upstanding operating lever extending in a vertical position from said casing electrically connected to said radio control transmitter, and movable to an angular position by a second hand of the person;

e) indicia on a top surface of said casing about said operating lever, to indicate movement of said operating lever forward, rearward, left and right for activating said radio control transmitter to send electrical signals to said mobile unit; and f) an on/off switch is in said casing for said vacuum unit.

13. A remote control vacuum cleaner comprising:

a) a mobile unit, wherein said mobile unit includes a generally rectangular shaped body having a flat top wall, a rear wheel assembly in said body, means for driving said rear wheel assembly, a front wheel assembly in said body and means for steering said front wheel assembly;

b) a vacuum unit;

c) means for attaching said vacuum unit onto said mobile unit in a removable manner; and d) a remote control unit to operate said mobile unit and said vacuum unit, so that said mobile unit will move along a floor, while said vacuum unit will clean by suction, dirt and dust from the floor.

14. A remote control vacuum cleaner as recited in claim 13, wherein said driving means includes:

a) a battery carried in said body to supply power for said driving means;

b) a radio control receiver with a receiver antenna carried in said body and electrically connected to said battery;

c) a motor control servo carried in said body and electrically connected to said radio control receiver;

d) a drive motor carried in said body and operated by said motor control servo; and e) a gear reduction coupled to said rear wheel assembly and operated by said drive motor.

15. A remote control vacuum cleaner as recited in claim 14, wherein said steering means includes a steering servo carried in said body electrically connected to said radio control receiver and operable to said front wheel assembly.

16. A remote control vacuum cleaner as recited in claim 15, wherein said vacuum unit includes:

a) a generally rectangular shaped housing having a flat bottom wall to carry the various components for operating said vacuum unit;

b) a suction nozzle on a front end of said housing; and c) a handle on said housing, so that when said vacuum unit is removed from said mobile unit, a person can grasp said handle and use said vacuum unit as an independent cordless handy appliance.

17. A remote control vacuum cleaner as recited in claim 16, further including means for recharging said battery built into said body, wherein said recharging means includes:

a) a battery charger carried in said body and electrically connected to said battery;

b) a jack in said body electrically connected to said battery charger;

c) a jack plug to engage with said jack;

d) an elongated electrical cord connected at a first end to said jack plug; and e) a transformer plug connected to a second end of said elongated electrical cord, whereby said transformer plug engages with a wall outlet to operate said battery charger in said body.

18. A remote control vacuum cleaner as recited in claim 17, wherein said recharging means further includes a vacuum charge pin electrically connected to said battery charger, so that when said vacuum unit is attached to said mobile unit, said battery charger will also recharge a battery carried within said housing of said vacuum unit.

19. A remote control vacuum cleaner as recited in claim 18, wherein said attaching means includes:

a) a vacuum docking bracket located at a forward end between said mobile unit and said vacuum unit; and b) a spring clip latching mechanism at a rearward end between said mobile unit and said vacuum unit.

20. A remote control vacuum cleaner as recited in claim 19, further including a suction nozzle hood adapter hinged to said suction nozzle of said housing of said vacuum unit, so that said suction nozzle hood adapter will reach down to suck up the dirt and dust upon the floor.

21. A remote control vacuum cleaner as recited in claim 18, wherein said attaching means includes:

a) a first VELCRO pad affixed onto said mobile unit; and b) a second VELCRO pad affixed under said vacuum unit, so that when said vacuum unit is placed upon said mobile unit, said first VELCRO pad will mate with said second VELCRO pad.

22. A remote control vacuum cleaner as recited in claim 21, further including a suction nozzle hood adapter built into a forward end of said mobile unit, so that said suction nozzle of said housing of said vacuum unit can plug into said suction nozzle hood adapter to suck up the dirt and dust upon the floor.

23. A remote control vacuum cleaner as recited in claim 18, wherein said remote control unit includes:

a) a casing held by a first hand of a person;

b) a radio control transmitter with a transmitter antenna carried in said casing;

c) a battery carried in said casing, to supply power to said radio control transmitter;

d) an upstanding operating lever extending in a vertical position from said casing electrically connected to said radio control transmitter, and movable to an angular position by a second hand of the person;

e) indicia on a top surface of said casing about said operating lever, to indicate movement of said operating lever forward, rearward, left and right for activating said radio control transmitter to send electrical signals to said mobile unit; and f) an on/off switch in said casing for said vacuum unit.

* * * * *